(12) United States Patent
Thornton

(10) Patent No.: US 8,074,578 B2
(45) Date of Patent: Dec. 13, 2011

(54) LINEAR SYNCHRONOUS MOTOR POWER CONTROL SYSTEM AND METHODS

(75) Inventor: Richard D. Thornton, Concord, MA (US)

(73) Assignee: Magnemotion, Inc., Devens, MA (US)

( * ) Notice: Subject to any disclaimer, the term of this patent is extended or adjusted under 35 U.S.C. 154(b) by 0 days.

(21) Appl. No.: 11/770,701

(22) Filed: Jun. 28, 2007

(65) Prior Publication Data

US 2008/0006172 A1    Jan. 10, 2008

Related U.S. Application Data

(60) Provisional application No. 60/818,697, filed on Jul. 5, 2006.

(51) Int. Cl.
*B60L 13/04* (2006.01)
*B61L 3/00* (2006.01)

(52) U.S. Cl. .................................... 104/281; 246/187 B

(58) Field of Classification Search .................. 104/281, 104/282, 284, 286; 246/187 R, 187 B; 318/38, 318/135
See application file for complete search history.

(56) References Cited

U.S. PATENT DOCUMENTS

| | | | |
|---|---|---|---|
| 3,158,765 A | 11/1964 | Polgreen | |
| 3,706,922 A | 12/1972 | Inagaki | |
| 4,068,152 A * | 1/1978 | Nakamura et al. | 318/135 |
| 4,348,618 A * | 9/1982 | Nakamura et al. | 318/38 |
| 4,454,457 A * | 6/1984 | Nakamura et al. | 318/135 |
| 4,955,303 A | 9/1990 | Ikeda | |
| 5,361,707 A * | 11/1994 | Fujie et al. | 104/281 |
| 5,628,252 A * | 5/1997 | Kuznetsov | 104/284 |
| 5,839,567 A | 11/1998 | Kyotani et al. | |
| 5,904,101 A * | 5/1999 | Kuznetsov | 104/281 |
| 5,929,541 A * | 7/1999 | Naito et al. | 310/12 |
| 6,236,124 B1 * | 5/2001 | Sekiyama et al. | 310/12 |

\* cited by examiner

*Primary Examiner* — Joe Morano, IV
*Assistant Examiner* — R. J. McCarry, Jr.
(74) *Attorney, Agent, or Firm* — Nutter McClennen & Fish LLP; David J. Powsner; Christopher J. Stow

(57) ABSTRACT

A system is disclosed that controls the power flow to Linear Synchronous Motor (LSM) stators for a vehicle transport system. This invention allows multiple vehicles to operate in close proximity in a guideway without requiring an excessive number of separate controllers. It can be used in conjunction with schemes now in use and is particularly useful in elevator hoistways or for automated people movers near stations.

10 Claims, 2 Drawing Sheets

LINEAR SYNCHRONOUS MOTOR POWER CONTROL SYSTEM AND METHODS

REFERENCE TO RELATED APPLICATIONS

This application is related to, and claims the benefit of priority of, U.S. Patent Application Ser. No. 60/818,697, filed Jul. 5, 2006, entitled "Linear Synchronous Motor Power Control System," the teachings of which are incorporated herein by reference.

BACKGROUND OF THE INVENTION

The invention pertains to guideway operated vehicular systems and, more particularly, to improved methods and apparatus for controlling and propelling vehicles utilizing linear synchronous motors. The invention has application in people movers and materials transport systems, to name but a few.

A Linear Synchronous Motor (LSM) can be used to propel vehicles in a wide variety of systems for transporting people and goods. The type of LSM most appropriate for these missions is the "long stator" version in which the stator, or primary, runs the entire length of the guideway and the vehicle, or secondary, is much shorter and moves in close proximity to the stator. In order to handle multiple vehicles it is necessary to divide the guideway into regions that are typically referred to as "blocks" and to provide a separate power control system for each block. Such a power control system typically includes a power source (in the case of an LSM, a variable frequency, variable voltage, multi-phase source) and a controller (microprocessor-based or otherwise) with position sensing, e.g., to adjust the inverter to insure proper vehicle operation. Throughout this application, the power control system of an LSM is referred to as an "inverter."

A common prior art configuration of the power control system of an LSM is to have a separate inverter for each block. An example of an implementation of this power control scheme is shown in U.S. Pat. No. 3,158,765, Magnetic system of transportation. That patent shows a power control scheme that is similar to FIG. 1 hereof. As a vehicle enters each block, the inverter for that block is activated (e.g., by the associated controller) for powering the moving vehicle while it is within that block. Simple block switching of this type is satisfactory if the vehicles are not too close and the power dissipation in the stator is not too large.

In the case of transportation systems where the vehicles travel long distances with considerable distance between vehicles and especially when the force is relatively large, the prior art teaches the use of "sub-block switching". Examples of this are illustrated in U.S. Pat. No. 4,068,152, Power Supply System for a Linear Motor, and U.S. Pat. No. 5,361,707, Multiple feeder system of feeder sections for feeding ground coils of superconductive magnetically levitated railway. These patents show a power control scheme as generally shown in FIG. 2 hereof wherein each block is be divided into multiple sections, each of which is coupled to one of a bank of inverters for that block by an associated switch. As a vehicle enters each block, the appropriate inverter for that block is activated and the associated switches are used to couple power from it to those sections of the block in which the moving vehicle is located.

Prior art sub-block switching schemes take advantage of the fact that a switch is considerably less expensive than an inverter. There are many ways to implement sub-block switching and some of these are described in U.S. Pat. No. 4,454,457, Power supply system for a linear motor, and U.S. Pat. No. 4,955,303, Linear motor feeder system.

A problem with sub-block switching is that it does not permit propulsion and control of multiple vehicles which are closely spaced. As an example, it is not suitable for elevator applications of the LSM where two or more cabs operate in the same hoistway and have to move independently, even stopping on adjacent floors anywhere in a building. Nor, by way of further example, is it suitable for transit system applications, where it is desirable to have short spacing between vehicles in and near stations. In instances such as these, it is not necessary to have close spacing everywhere along the guideway, however, such need does exist at specific locations.

An object of the invention is to provide improved linear synchronous control systems and methods. A further object of the invention is to provide such systems and methods for use in guideway operated vehicles.

A still further object of the invention is to provide such systems and methods as permit independent powering and/or control of closely spaced vehicles—even in instances where multiple vehicles are in a single block.

A related object of the invention is to provide such systems and methods as can also be used where vehicles are not so closely spaced.

SUMMARY OF THE INVENTION

These and other objects are attained by the invention which provides, in some aspects, a power control system and method for use with LSM propulsion that uses overlapping blocks so as allow closely spaced vehicles without the need for short blocks. Such a power control system can be used in conjunction with other control schemes to permit propulsion and control of closely-spaced vehicles in designated regions of the guideway, e.g., in and near stations. In or other regions of the guideway, other control schemes can be used. Systems and methods according to the invention combine advantages of both simple block switching and sub-block switching More particularly, the invention provides, in some aspects, power control systems and methods for use with LSM propulsion in which multiple inverters are switchably coupled to a common region of a guideway. That region may comprise a block or a portion thereof and, as a result of the switchable coupling, permits the inverters to propel and control multiple respective vehicles within that block.

Related aspects of the invention provide such systems and methods in which first and second inverters are at least switchably coupled to respective ones of first and second adjacent blocks of the guideway. A common region of at least the first block is switchably coupled to both inverters. That common region, according to still further related aspects of the invention, is disposed substantially adjacent to the second block.

Still other aspects of the invention provide such systems and methods in which first and second vehicles that are concurrently disposed with the first block are concurrently propelled and controlled by the first and second inverters, respectively.

Other aspects of the invention provide a guideway for LSM propulsion of multiple vehicles having a power control system as described above. Still further aspects provide such a guideway in which the first, second and/or other inverters are coupled to regions of the guideway other than the aforesaid common region, for propelling and controlling vehicles thereon in accord with any of simple block and sub-block switching schemes.

Yet still other aspects of the invention provide methods of operating a LSM paralleling the operations described above.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Linear synchronous motors have been used in a variety of applications for many years and are well described in many published papers and books. A common problem of all versions of the LSM is the need to have a separate inverter (including the inverter controller) for each vehicle, even if vehicles are all moving at the same speed. It is also important to be able to have vehicles operate in close proximity. A particularly difficult problem is to find an economic way to control each vehicle without dissipating too much power in stator segments that are not contributing to propulsion and without using too many controllers or restricting vehicle spacing in undesirable ways. The illustrated embodiment addresses this problem by showing how modification to existing technology can produce substantial benefits. In the following discussion FIGS. 1-2 describe existing prior art technology, while FIGS. 3-4 illustrate LSM power control schemes and applications in accord with the invention.

Figure 1:
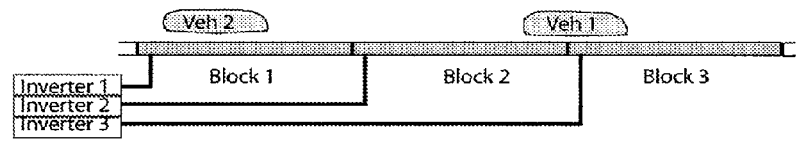
FIG. 1 shows a simple block switching scheme of the type known in the art in which there is a separate inverter for each block.

In FIG. 1 assume the vehicles are moving left to right with the block length greater than the vehicle length. Vehicle 2 is entirely in Block 1 so that the entire propulsive force is provided by the stators in Block 1. Vehicle 1 is making a transition from Block 2 to Block 3 so both of these blocks are excited. Vehicle 1 must move completely out of Block 2 before Vehicle 2 can enter it. This scheme involves either many blocks with a high expense for inverters or fewer blocks with more power dissipation and heating of the stators. It is a good system when vehicle velocity is high, vehicle spacing is not too close and stator heating is not a major problem. It is also a good system where the power levels are low and inverter cost is not a major consideration.

Figure 2:
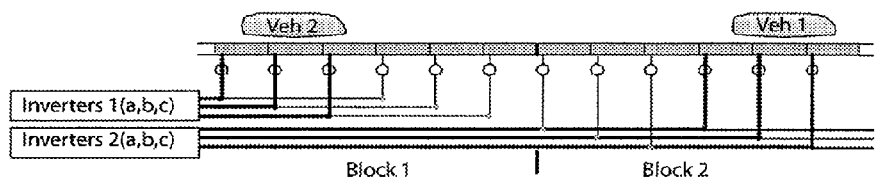
FIG. 2 shows a sub-block switching scheme of the type known in the art in which only those stator segments that can create propulsive force are energized but the blocks are significantly longer than the vehicles.

In FIG. 2 there are only 2 blocks, but each block is divided into sub-blocks so as to reduce stator heating and power loss. One-way switches, indicated by circles with a control line running through them, determine whether an inverter is connected to a sub-block. In the drawing the heavier lines and circles with lines through them are carrying current and the lighter lines and empty circles are not carrying current. A vehicle can move in a block in which another vehicle is in a different sub-block and is stationary, but two vehicles can not move independently in the same block. Hence Vehicle 1 must leave Block 2 before Vehicle 2 can enter it and thus the block length is limited by headway constraints. This scheme is advantageous for moving vehicles up a steep hill or vertically if the spacing between them does not have to be too small In some cases the vehicle may be short compared to the length of a sub-block length with only 2 inverters per block, while in other cases the vehicle may be long compared to the length of the sub-block and more than 2 inverters used. In some cases it may not be necessary to have powered stators under the entire vehicle and this may reduce the number of inverters required. There are several possible implementations of sub-block switching known variously as short-circuit, leap-frog, triplex, etc. They all achieve the same result with certain relative advantages and disadvantages.

Figure 3:
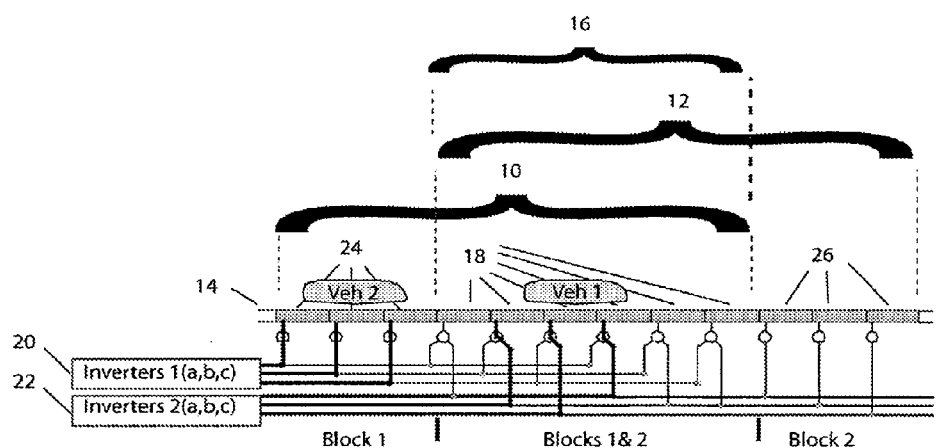
FIG. 3 shows the use of sub-block switching scheme with overlapping blocks according to the invention that allow close vehicle spacing.
Figure 4:
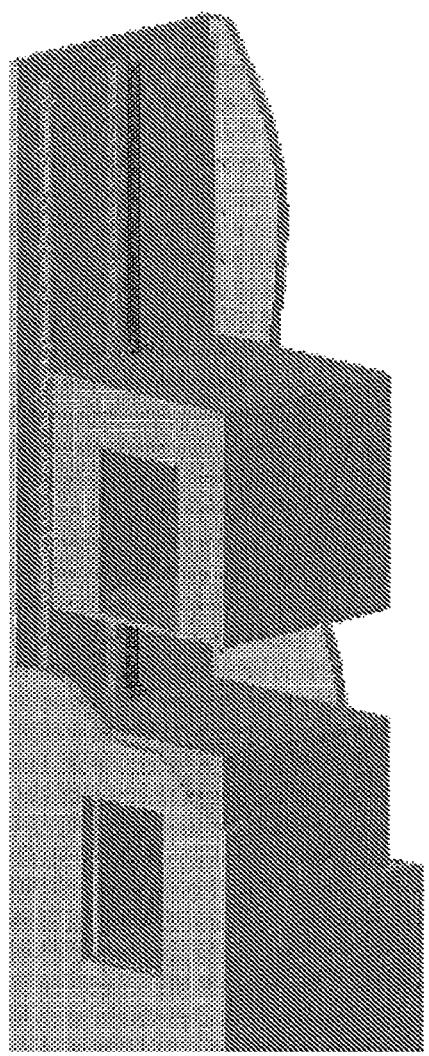
FIG. 4 shows an example of two LSM propelled elevators operating in close proximity in a single hoistway utilizing a sub-block switching scheme with overlapping blocks according to the invention.

In FIG. 3 there are shown two adjacent blocks 10 ("Block 1"), 12 ("Block 2") on guideway 14 that have a region of overlap 16 (or "common" region). Two-way switches, indicated by circles with a two control lines running through them, on the overlapped stators that make up the sub-blocks 18 of region 16 allow each sub-block 18 to be electrically coupled to either of two inverters 20, 22. Inverter 20 is further coupled to the sub-blocks 24 that comprise the remainder of block 10 via one-way switches indicated by circles with single control lines running through them. Inverter 22 is likewise further coupled to sub-blocks 26 that comprise the remainder of block 12 via one-way switches, as shown. Inverters 20, 22 and/or still other inverters (not shown) may be coupled to still other blocks that make up guideway 14 utilizing the power control scheme shown in FIG. 3, the simple block scheme of FIG. 1, the sub-block scheme of FIG. 2, or otherwise.

Guideway 14, including its attendant blocks 10, 12, and their respective sub-blocks 18, is of the type generally known in the art of LSM guideways—as adapted in accord with the teachings hereof. Inverters 20, 22 are of the type known in the art as typically used, for example, in a sub-block switching scheme. The aforesaid one-way switches are of the type generally known in the art and shown, for example, in FIG. 2. The aforesaid two-way switches are adapted therefrom in such manner as evident to those of ordinary skill in the art.

This power control scheme illustrated in FIG. 3 allows the two vehicles, labeled "Veh 1", "Veh 2" (which may comprise people movers, material movers or other transports of the type known in the art bearing LSM secondaries), to be very close without having short blocks. Note that both vehicles can operate at the same time in the region where Blocks 1 and 2 overlap. The disadvantage is the need for a two-way switch which costs more than a one-way switch but is significantly less expensive than the use of short blocks with many inverters. In many cases, such as shown in FIG. 3, the overlapping regions of the blocks do not have to be too long if there are only certain locations where the vehicles must operate in close proximity.

FIG. 4 shows an example of two elevator cabs operating in close proximity in a single guideway—or, as such is more typically called in the case of elevators, a "hoistway." A similar situation occurs when two transit vehicles operated in close proximity in and near a station. This FIG. shows a single flat LSM propelling the elevator but there can be two or more LSMs, such as one on each of two sides of the cab, and the LSM could be double-sided, tubular, or any other type that has particular advantages for this application.

In some instances it is only necessary to have the vehicles in close proximity near a station, or in the case of an elevator, near the lower floors. In these cases it is possible to use overlapping blocks in part of the guideway (or hoistway) and other power control means for the rest of the distance.

Shown in the drawings and discussed above are systems and methods meeting the desired objects. It will be appreciated that the illustrated herein are just embodiments of the invention and that other embodiments, incorporating changes thereto, fall within the scope of the invention. By way of non-limiting example, it will be appreciated that the vehicles propelled along guideway 14 of FIG. 3 may be of single-car, multi-car or other configurations. By way of further non-limiting example, it will be appreciated that the common regions 16 may be coupled to additional inverters (e.g., by three- or more-way switches) consistent with the teachings hereof.

In view of the foregoing, what I claim is:

1. A power scheme for an LSM propulsion system containing
   A. a multiplicity of stator segments, or sub-blocks,
   B. a multiplicity of multi-way switches with the outputs connected to the sub-blocks, where each of the multi-way switches has a plurality of inputs for selecting among a plurality of inverters for powering the sub-blocks,
   C. inverters connected to each of the switch inputs, and
   D. control signals that actuate the switches and determine which inverter is connected to which sub-block.

2. The combination of the power scheme of claim 1 and conventional switching schemes that do not have multi-way switches connected to sub-blocks.

3. In a linear synchronous motor (LSM) propulsion system of the type used with a guideway that is made up of a plurality of blocks, each comprising a stator segment, the improvement comprising
   A. a plurality of inverters that are switchably coupled to a common region of the guideway, where that region comprises a block or portion thereof,
   B. a plurality of switches, each of which has (i) an output coupled to a respective subregion of the common region of the guideway and (ii) a plurality of inputs that provide electrical coupling to the plurality of inverters, wherein each switch determines which one of the plurality of inverters is coupled to the respective subregion.

4. In the linear synchronous motor (LSM) propulsion system of claim 3, the improvement wherein the plurality of switches are configured to propel multiple respective vehicles within the block.

5. In the linear synchronous motor (LSM) propulsion system of claim 3, the improvement wherein the plurality of switches are configured to propel multiple respective vehicles within the common region, where each such vehicle comprises a secondary of the LSM.

6. In the linear synchronous motor (LSM) propulsion system of claim 3, the improvement wherein each of the plurality of inverters comprises a power source and a controller that includes position sensing.

7. A guideway operated vehicle transport system comprising
   A. a guideway that is made up of a plurality of blocks, each comprising a stator segment, wherein the plurality of blocks include at least first and second blocks that are adjacent to one another,
   B. first and second inverters that are at least switchably coupled to respective ones of first and second blocks of the guideway, and
   C. a plurality of switches, each of which has (i) an output coupled to a common region of at least the first block and (ii) first and second inputs that provide electrical coupling to respective first and second inverters, wherein each switch determines which inverter is coupled to the common region of at least the first block.

8. The guideway operated vehicle transport system of claim 7, wherein the common region of the first block is disposed substantially adjacent to the second block.

9. The guideway operated vehicle transport system of claim 8, wherein first and second vehicles that are concurrently disposed with the first block are concurrently propelled by the first and second inverters, respectively, wherein the first and second vehicles comprise secondaries of the LSM.

10. The guideway operated vehicle transport system of claim 8, wherein the first, second and/or other inverters are coupled to regions of the guideway other than the aforesaid common region, for propelling vehicles thereon in accord with any of simple block and sub-block switching schemes.

* * * * *